United States Patent [19]

Schwarzmann et al.

[11] 3,895,007

[45] July 15, 1975

[54] MANUFACTURE OF MELAMINE

[75] Inventors: Matthias Schwarzmann, Limburgerhof; Alfred Widmann, Mutterstadt; Ludwig Vogel, Frankenthal; Dieter Fromm, Gruenstadt, all of Germany

[73] Assignee: Badische Anilin- & Soda-Fabrik Aktiengesellschaft, Ludwigshafen (Rhine), Germany

[22] Filed: Apr. 20, 1973

[21] Appl. No.: 353,099

[30] Foreign Application Priority Data

Apr. 28, 1972 Germany .................... 2220905

[52] U.S. Cl. .......................................... 260/249.7 A
[51] Int. Cl. ............................................. C07d 55/28
[58] Field of Search ............................ 260/249.7 A

[56] References Cited
UNITED STATES PATENTS 3,578,413  5/1971  Vorage ........................... 260/249.7
3,657,236  4/1972  Fromm et al. ................... 260/249.7

*Primary Examiner*—John M. Ford
*Attorney, Agent, or Firm*—Johnston, Keil, Thompson & Shurtleff

[57] ABSTRACT

Catalytic manufacture of melamine from urea by thermal cracking of urea and converting the resulting cracked gases to melamine in the presence of catalysts. The thermal decomposition is carried out in a fluidized bed, the necessary heat being applied by heat exchangers located in the fluidized bed. Conversion of the cracked gases to melamine is effected either in the same fluidized bed, in which case the fluidized solid consists of conventional catalysts, or in a reaction zone remote from said fluidized bed. In the latter case, the solids fluidized consist of catalytically inactive particles, the conversion being carried out in the presence of catalysts in said reaction zone remote from the fluidized bed. In both cases, the urea is fed to the fluidized bed at a point above the heat exchangers.

4 Claims, No Drawings

MANUFACTURE OF MELAMINE

In the manufacture of melamine from urea at atmospheric pressure or slightly elevated pressures of up to about 10 atmospheres and temperatures of from 300° to 450°C in the presence of catalysts, urea is first thermally cracked into isocyanic acid and ammonia. This reaction is strongly endothermic, for which reason it is advantageous to carry out the reaction in a fluidized bed, by which means it is a simple matter to supply the considerable quantities of heat indirectly by means of heat exchangers located in the fluidized bed. Further conversion of the cracked products of urea to melamine may be carried out within the same fludized bed, in which case the solid material fluidized consists of the catalyst required for said melamine synthesis, particular examples of which are oxides having large internal surface areas such as silica gel or oxide gels of aluminum, titanium and zirconium, and also materials having only small internal surface areas such as aluminum phosphate, boron phosphate and crystalline titanium dioxide (anatase). Alternatively, this reaction may be carried out in a reactor which is remote from the said cracking reactor and which may be designed as a fluidized bed or fixed bed reactor. In this case, the solids fluidized in the first reactor will consist of material which is inert to melamine, for example sand whilst the necessary catalyst is contained in the second reactor. The urea is advantageously cracked at the pressure maintained in the second reaction zone, suitable temperatures for the cracking reaction being from 350°C to 400°C, whilst the conversion of the cracked gases in the second reaction zone is carried out at temperatures of from 350° to 450°C. Since the conversion of the cracked products to melamine is an exothermic reaction, the present trend shows a preference for the single-stage procedure. In this way the heat of reaction generated in the formation of melamine is utilized for the endothermic cracking of the urea. However, it is still necessary to apply additional heat in such a case, as more heat is required for cracking than is generated during the formation of melamine, and consequently heat exchangers located in the fluidized bed are still necessary. In order to achieve thorough mixing of the urea with the fluidized solids, the urea is fed to the fluidized bed at as low a point as possible.

It is well known that the cracked products resulting from urea have a highly corrosive action. It is known to protect the inner surfaces of the reaction vessel by maintaining their temperature at a level below the temperature used in the reaction chamber, by which means a dense, continuous deposit is formed over the inner surfaces of the reactor above the fluidized bed, which deposit effectively protects said inner surfaces from the corrosive action of the materials contained in the reactor atmosphere. Obviously, such protection is not possible for the heat exchangers located within the fluidized bed and it is therefore inevitable that the heat exchangers will be destroyed or at least severely damaged after long on-stream periods.

It is an object of the present invention to effect the catalytic synthesis of melamine from urea by thermal cracking of urea in a fluidized bed and catalytic conversion of the resulting cracked gases to melamine - the heat required for cracking being supplied indirectly by means of heat exchangers located within the fluidized bed - in such a manner the corrosion of the said heat exchangers is avoided or at least greatly reduced.

We have now found that this problem is solved by feeding the urea to the fluidized bed at a point above the heat exchangers.

Although it is well known that a fluidized bed is characterized by effecting rapid and very thorough mixing of the reaction components, the measure of the invention surprisingly provides effective prevention of corrosion of the heat exchanging equipment located in the fluidized bed, whilst it is remarkable that the conversions are not impaired despite the shorter residence times particularly of the gaseous cracked products of the urea in the fluidized bed. The process of the invention may be applied either to the single-stage or to the two-stage process, as described above.

The urea may be fed to the fluidized bed either at a single point, for example through a nozzle, or at a number of feed points distributed round the periphery of the reactor. Where a number of feed points are used, these may be arranged in a single plane or in a number of planes, in the latter case conveniently in staggered relation-ship. The ensure trouble-free and satisfactory operation, the feed points for the urea should be at least 1 meter below the surface of the fluidized bed. The heating elements of the heat exchangers are conveniently disposed horizontally.

EXAMPLE

A. In a fluidized bed reactor having a dimaeter of 1.6 m a fluidized bed of 7.6 m$^3$ of $\gamma$-Al$_2$O$_3$ is maintained with 750 m$^3$ (STP) of a mixture of 70% v/v of NH$_3$ and 30% v/v of CO$_2$. Liquid urea is fed to this fluidized bed at a rate of 300 kg/hr and at a point which is 1.8 m above the gas distributor. The temperature is maintained at the required level of 380°C by means of heat exchangers which are located within the fluidized bed at a point below the urea feed point.

100 kg/hr of melamine are obtained from the gases leaving the reactor in known manner at a conversion of 95%.

After an on-stream period of 8,000 hours, no sign of corrosion can be detected on the tubes of the heat exchangers.

B. As described in Example (A), 300 kg/hr of urea are converted to 100 kg/hr of melamine, this being equivalent to a conversion of 95%.

In this case however, the urea is fed to the fluidized bed at a point only 50 cm above the gas distributor. Thus the heat exchangers required for transferring the heat of reaction are located in the fluidized bed at a point above the urea feed point. The process is otherwise carried out under the same conditions as in (A) above. The tubes of the heat exchangers show irregular pithing up to a depth of 0.8 mm after only 300 hours.

We claim:

1. A process for the catalytic synthesis of melamine from urea in which urea is passed to a fluidized bed wherein it is cracked at a temperature of from 300° to 450°C to form isocyanic acid and ammonia gases and wherein said gases are reacted in the presence of a catalyst bed at temperature of from 300° to 450°C to form melamine, the improvement which comprises supplying the heat required for said cracking step indirectly by means of heat exchangers located within the fluidized bed and feeding urea to said fluidized bed at a point above said heat exchangers.

2. A process as set forth in claim 1, wherein thermal cracking and catalytic conversion of the cracked gases are effected in one and the same fluidized bed, the fluidized solids consisting of known catalysts for said conversion.

3. A process as set forth in claim 1, wherein thermal cracking of the urea is carried out in a fluidized bed comprising catalytically inactive particles and the resulting cracked gases are converted to melamine in the presence of known catalysts in a reaction zone which is remote from said fluidized bed.

4. A process as set forth in claim 1, wherein the urea is fed at a point above the heat exchangers and at least 1 m below the surface of the fluidized bed.

* * * * *